United States Patent

[11] 3,620,278

[72] Inventor Edward G. Markow
Oakdale, N.Y.
[21] Appl. No. 885,523
[22] Filed Dec. 16, 1969
[45] Patented Nov. 16, 1971
[73] Assignee The United States of America as represented by the Secretary of the Army

[54] HYBRID PNEUMATIC-MECHANICAL VARIABLE CONFIGURATION WHEEL
10 Claims, 4 Drawing Figs.

[52] U.S. Cl. .................................................... 152/9, 301/5, 305/19
[51] Int. Cl. ...................................................... B60b 9/00
[50] Field of Search ............................................ 301/5; 152/6, 7, 9, 10; 305/19; 180/7

[56] References Cited
UNITED STATES PATENTS
2,048,575  7/1936  South ........................... 152/7
2,709,982  6/1955  Straussler ..................... 152/9 X
2,843,171  7/1958  Howe ............................. 152/9
2,916,331  12/1959 Gardner ......................... 305/19
3,001,601  9/1961  Aghnides ....................... 301/5 UX
3,217,775  11/1965 Lawson .......................... 152/9
3,459,454  8/1969  Liston ........................... 305/19 X Primary Examiner—Richard J. Johnson
Attorneys—Harry M. Saragovitz, Edward J. Kelly, Herbert Berl and Edward P. Barthel ABSTRACT: A variable-geometry-type vehicle wheel whose profile can be automatically changed as required from a circular configuration for normal operation on roads to an elliptical configuration for off-the-road travel to increase traction. The profile of the wheel, formed with a flexible pneumatic spoke membrane and resilient rim is changed from a circular shape to an elliptical shape by canting the wheel hub disks relative to the wheel shaft centerline.

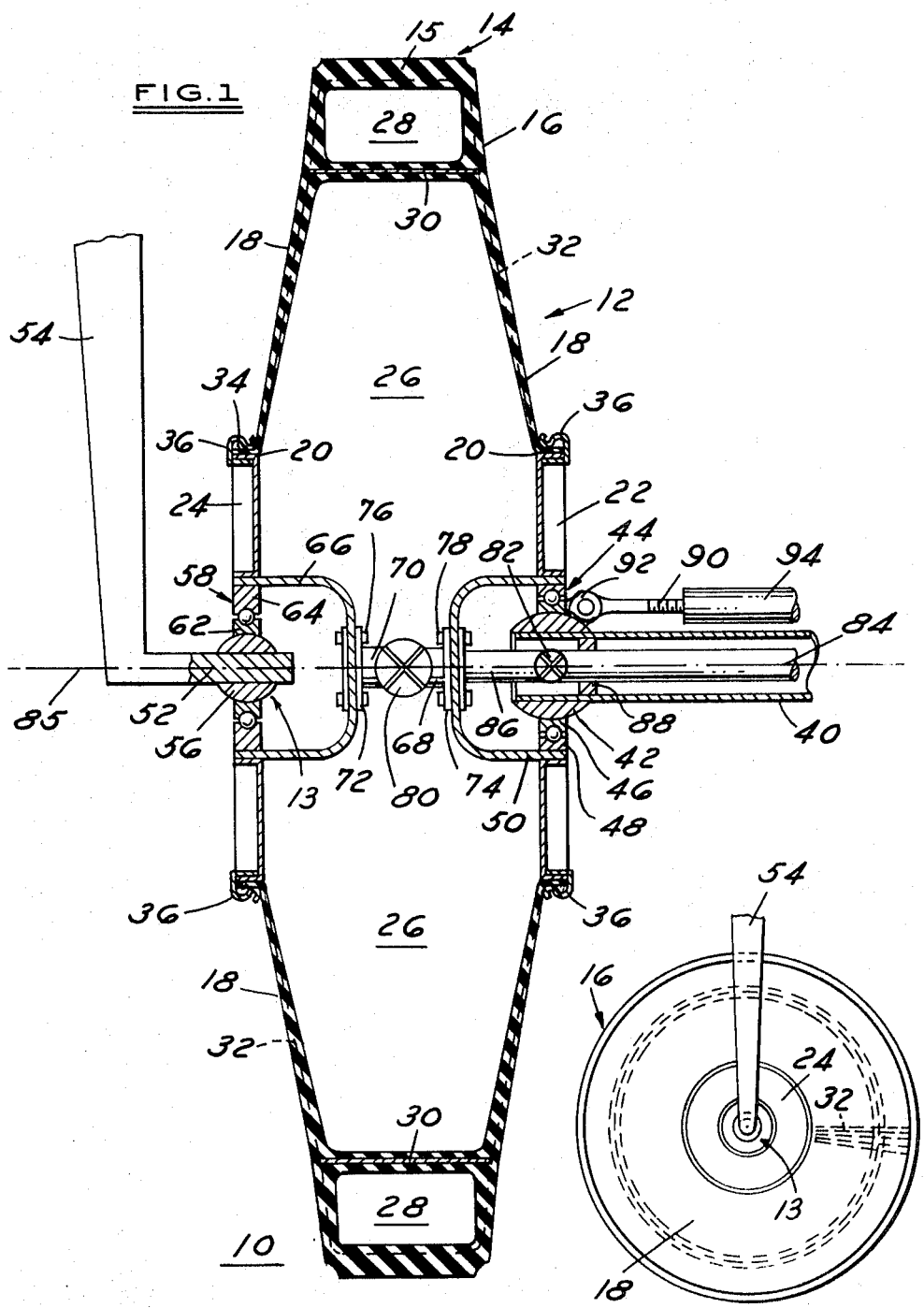

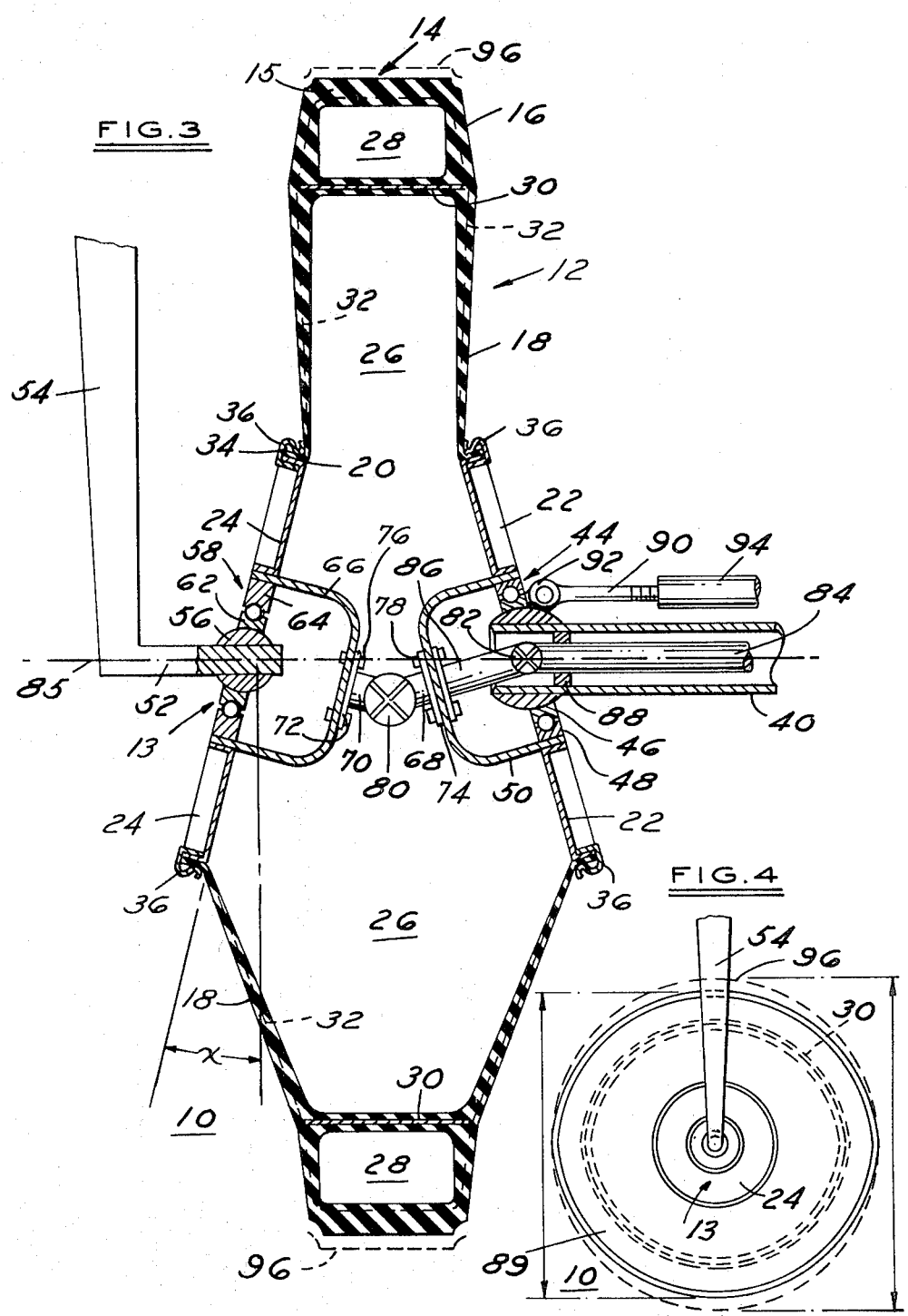

3,620,278

HYBRID PNEUMATIC-MECHANICAL VARIABLE CONFIGURATION WHEEL

BACKGROUND OF THE INVENTION

1. Field of the Invention

This invention relates to a novel variable configuration vehicle wheel assembly and more particularly to a variable-geometry-type wheel assembly whose profile can be changed from circular to substantially elliptical for increased traction to compensate for varying driving conditions.

2. Description of the Prior Art

Prior art mechanism used to increase traction and wheel contact area have included wheels with flexible rims, large tires, antiskid devices and flexible spokes which produce long, narrow ground contact areas. Examples of wheels of the foregoing types can be found in issued U.S. Pat. Nos. 1,810,854; 2,916,331, and 3,394,748.

When attempting to improve performance by increased traction, it is necessary to cause either more soil failure or cause the soil to fail in such a way as to increase the resistance to failure. The former is achieved by an increase in wheel contact area and the latter by means of proper grouser design. Attempts to produce a significant performance improvement through the use of grousers, have generally proved unacceptable for operation on hard ground. Specific prior art developments have included grousers which extend beyond the outer periphery of the tire; the hubless wheel having a flexible rim which serves as both the suspension and drive mechanism, several wheel forms developed for lunar vehicle application which incorporate flexible rims and flexible spokes, various antiskid devices using liquids or air as a lubricant, and concentric dual tires.

A prior elliptical wheel design disclosed in U.S. Pat. No. 3,459,454 issued Aug. 5, 1969 explained that a conventional solution to the problem of increased traction would, for example, attempt to increase soft soil performance by increasing the dimensions of the wheel and thereby decrease the wheel pressure. Conventional methods have accomplished this by either increasing the width of the wheel track or making the wheel with a larger diameter. Both of these solutions are undesirable for the reasons which will follow.

As is well known, motion resistance is proportional to contact area and width. A given area increase will produce a fixed increase in traction independent of whether the increase is produced by greater width of diameter. However, motion resistance is proportional to width, therefore, more force is required to move a vehicle mounted on wide wheels even though both sets of wheels have the same surface contact area. Hence, increasing the width of the wheels is undesirable.

Another factor to be considered in wheel design is wheel slip. In order for a wheel to develop traction, it is necessary that soil be deformed and then the wheel will slip. For a given contact area, the percentage of slip relative to the contact length will be much less for a narrow wheel than it will be for a wider wheel. The decreased slip will greatly increase vehicle efficiency. The present invention provides the desirable effect of a wheel of large diameter without incorporating the disadvantages of same.

SUMMARY

The instant invention provides an elliptical wheel assembly whose major axis is maintained in a horizontal orientation to improve mobility in weak soils. This is accomplished by means of a variable-geometry-type wheel whose profile can be changed as required from a circular configuration for high-speed operation on roads to an elliptical configuration for off-the-road travel. Applicant's wheel has a resilient flexing rim element supported on either side by a spoke membrane assembly which is connected to a pair of opposed, relatively movable disks comprising the wheel hub. Each disk also is mounted on axle means such that it can be canted relative to the axle centerline about a fixed horizontal pivot located normal to the axle centerline. Thus, although the hub disks may rotate freely with the wheel on the axle when the disks are canted with respect to the axle, the plane of rotation of the disks will be angularly displaced from the plane of rotation of the entire wheel assembly.

Sealing means are provided for the wheel such that pneumatic pressurization of the volume enclosed by the spoke membrane assembly allows some of the load on the wheel to be supported pneumatically. In addition, the pressure acting on the walls of the membranes when the wheel is pressurized assists in the disk canting action which controls the wheel profile in a manner that will be described in greater detail. The spokes, which are the principal load-bearing elements of the wheel, are closely spaced radial wires embedded in the elastomeric membrane. While the preferred embodiment of the invention shows a pneumatic tire bonded to the resilient rim so that it is an integral part of the wheel, it will be understood that various solid tires could also be used.

In applicant's variable-geometry wheel assembly, the configuration or profile of the wheel is changed from a circular shape to an elliptical shape by canting the hub disks relative to the wheel axle centerline. With the hub disks normal to the axle centerline, the wheel rim will have a circular profile while with the hub disks canted relative to the shaft centerline, the wheel rim will have an elliptical profile. Various mechanisms can be utilized to move disks to thereby vary the profile of the wheel.

The preferred embodiment of the instant invention utilizes a pair of cooperating hub disks such that the inboard disk is canted by mechanical actuator means with the outboard disk slaved to the inboard disk resulting in their mirrored movement.

BRIEF DESCRIPTION OF THE DRAWINGS

Other features and the advantages of the present invention will be apparent from the following description taken with the accompanying drawings in which:

FIG. 1 is a diametric section taken through a wheel embodying the invention.

FIG. 2 is a side elevation view of the wheel of FIG. 1.

FIG. 3 is a diametric section taken through the wheel of FIG. 1 wherein the hub disks are canted to produce an elliptical profile.

FIG. 4 is a side elevation view of the wheel of FIG. 3.

DESCRIPTION OF THE PREFERRED EMBODIMENT

Referring now to FIG. 1, the wheel assembly 10 is shown as comprising an annular wheel 12 mounted on a hub and axle arrangement indicated generally at 13. The wheel 12 has an outer tire portion 14, including a tread structure 15, and a carcass 16, formed integrally with flexible wheel sidewalls 18 in the form of elastomeric membranes having outwardly projecting external peripheral lips 20 for releasably bonding to inboard and outboard hub disks 22 and 24 respectively. The tire carcass 16 and wheel sidewalls 18 are preferably formed of conventional pneumatic tire making material, i.e., cord fabrics such as nylon or rayon with elastomeric coatings of conventional tiremaking rubber compounds, as is the thread region 15.

In the present instance, the wheel assembly comprises a pair of pneumatic chambers; i.e., a main wheel chamber 26 and a secondary tire chamber 28. The main and secondary chambers 26 and 28 respectively can be independently inflated by separate valves (not shown) when it is desired tat the chamber 28 be maintained at high pressure in contrast to the chamber 26 which is maintained at low pressure. If a low-pressure tire 14 is used, openings connecting the chambers 26 and 28 could be provided so that both tire and wheel volumes could be inflated in common. It should be noted that the integral low-profile pneumatic tire could be of the solid tire type without changing the concept of applicant's invention.

The wheel 12 has a resilient annular flexing rim member 30 supported on either side by radial spoke membrane elements 32 which in the preferred embodiment are stranded steel cables. The rim member 30 is preferably formed from spring steel or an equivalent metallic material. As seen in FIG. 2 the spokes 32, providing the principal load-bearing elements of the wheel, are closely spaced radial wires embedded in the elastic sidewall membranes 18. The spokes 32 in the instant embodiment have a diameter within the range of 0.005–0.010 inches, are spaced substantially three wire diameters apart at the hubs 22 and 24 and the design of the wheel is such that the loads on the spokes are substantially in tension. The continuous flexible but nonextensible elements which serve as the spokes 32 extend from one of the hub disks, pass through the pneumatic outer thread 16 and terminate at the other hub disk. The spokes are each secured to the rim member 30 at its inner and outer edges and are secured to reinforcing annular bead elements 34 embedded in the lip portions 20 of the tire. Holding members, such as a "marmon clamp" shown at 36, are provided to secure the sidewall membranes 18 to the outer periphery of each of their associated wheel disks 22 and 24.

As indicated in FIG. 1, a tubular axle 40 is supported in the vehicle hull by suitable bearings (not shown). The inboard hub disk 22 is pivotally attached to the tubular axle 40 by means of a spherical bushing 42 fixedly attached to axle 40. An annular inboard ball bearing assembly 44 is located such that the inner race 46 of which rotatively contacts the bushing 42 while the outer race 48 of the bearing assembly 44 is secured around the inner periphery of an inboard housing member 50.

The outboard hub 24 is pivotally attached to the stub axle 52 of an outboard vehicle support 54 by means of a slidable spherical bushing 56. A ball bearing support assembly 58, similar to assembly 44, having inner race 62 and outer race 64, is provided for mounting the spherical bushing 56 within an outboard housing 66.

A pair of countershafts 68 and 70 are secured to the housings 50 and 66 respectively by suitable means such as support plates 72 and 74 with bolts 76 and 78. A first constant speed universal means 80 is supported between the countershafts 68 and 70 to provide for movement therebetween. A second constant speed universal means 82 is shown supported between a rotating axle shaft 84 and a jack shaft 86 and journaled in a support bearing 88 which is secured in the vehicle tubular axle 40. As is usual in a universal joint arrangement of this type, a splined sleeve design (not shown) is provided to accommodate variations in the length of the joint due to the canting action of the hubs.

Actuating bar 90 is positioned parallel to the axle shaft 84 and its forward end is pivotally connected at 92 of the inner race 46 of the inboard ball bearing assembly 44 and its other end is threadably connected to a driving nut member 94. The nut member 94 is suitably engaged, such as by a driving screw driven by a reversible electric motor (not shown), for controlling the ellipticity of the hub disks in a manner to be described.

It will be seen from the drawings that the configuration profile of the wheel assembly can be changed from the circular shape of FIGS. 1 and 2 to an elliptical shape of FIGS. 3 and 4 by canting the hub disks 22 and 24 relative to the centerline of the axle shaft 84, indicated by centerline 85. With the hub disks normal to the centerline 85, so as to be substantially parallel as viewed in FIG. 1, the wheel will have a circular configuration. When the hub disks 22 and 24 are canted relative to centerline 85 the rim member 30 will be deformed into an elliptical shape as shown at 89 in FIG. 4. Obviously ellipticity is determined by the cant angle of inclination $x$ (FIG. 3) for a given hub disk diameter; limits of which are established by angular travel of the universal-type fittings and clearance for the particular wheel geometry. While the instant embodiment is shown having a cant angle $x$ of approximately 15° it should be understood that applicant's invention is not limited to this angle but is intended to include modifications that will allow for a range of cant angle of the order of 30° or more. It will be understood that the tire portion 14 of applicant's wheel assembly 10 is formed with sufficient resiliency so that it will assume substantially the same elliptical shape as the resilient rim 30.

It will be seen with the hub disks in their vertical position the spoke membranes 18 will be under radial tension which is, in effect, evenly distributed around the membranes. If each of the disks 22 and 24 were free to pivot or cant about its related spherical bushing 42 and 56, tension forces would retain the hub disks in a position normal to the shaft 84 viewed in FIGS. 1 and 2. When the hub disks are moved toward their canted position by actuating bar 90 the conditions of evenly distributed tension around the spoke membrane will no longer prevail. The change in the forces acting on the rim member 30 of the wheel causes the top and bottom portions of the rim member 36 to deflect inwardly toward the centerline 85 to deform the wheel into the elliptical shape shown in FIGS. 3 and 4. It should also be noted that the loads on the spokes 32, even with the hub disks canted fully, remain essentially tensile loads in which the physical properties of the radial spokes 32 are utilized to their best advantage.

When the hub disks are held vertical in parallel relationship (FIG. 1) the tensile loads on the radial spoke elements 32 cause the wheel automatically to assume a circular configuration. When the hub disks 22 and 24 are pivoted by the mechanical means 90, 94 inwardly (FIG. 3), the tensile loads on the radial spoke elements 32 are maintained by the hub disks 22, 24 while canting.

In operation the positive actuation means, shown partially at 94 in the preferred embodiment as an electric screwjack mounted on the fixed axle housing 40, operates to cant the hub disks positively and thereby control the ellipticity of the wheel. Linkage 92 on the output end of the actuator shaft of the screwjack transmits the output movement of the jack to the inner race 46 of the inboard hub disk bearing 44. Axial movement to the left of the actuating bar 90 causes the inner race 46 of the inboard hub disk bearing to move to the position shown in FIG. 3 on the surface of the spherical bushing 42. Movement of the inner race 46 will, of course, produce a related movement of the outer race 48 and of the hub disk 22 and housing 50 associated therewith. As the inboard hub disk 22 is slaved to the outboard hub disk 24 through the disks housings and countershafts 68 and 70 linked by the constant speed universal 80, any canting movement of the inboard disk 22 will be mirrored by a related canting movement of the outboard disk 24.

The canting of each of the hub disks is about the horizontal axis 85 of rotational axle 84. The axis 85 is normal to the axis of the vehicle drive axle (not shown) and passes through the center of the spherical bushing 42 and 56. As previously stated the angular position of the wheel hub disks relative to the wheel axle centerline 85 regulates the configuration of the wheel assembly 10, such that canting the hub disks relative to centerline 85, as shown in FIG. 3 causes the resilient rim 30 and tire 14 to assume an elliptical configuration. The dashed lines 96 of FIGS. 3 and 4 indicate the position of tire 16 when the wheel has a substantially circular configuration. The diameter of wheel assembly 10 when in its circular position is indicated by dimension $x$ while the smaller dimension $y$ indicates the overall height of wheel assembly 10 when in its elliptical form (FIG. 3). It should be noted that the sidewalls 18 together with spokes 32 may have a slight outward bulge when the wheel assembly is in its round configuration (FIGS. 1 and 2) due to the air pressure in chamber 26.

I wish it to be understood that I do not desire to be limited to the exact details of construction shown and described, for obvious modifications will occur to a person skilled in the art.

I claim:

1. A pneumatic wheel assembly for vehicles comprising:
   a resilient rim member,
   supporting axle means having a centerline,
   a pair of spaced cooperating disk members rotatably mounted on said axle means and pivotable on pivot axes lying on said centerline, flexible wheel sidewalls joining said disk members and said rim member, and means for canting said disk members about said pivot axes whereby said resilient rim member can be varied from a substantially round to a substantially elliptical configuration.

2. The wheel assembly according to claim 1 wherein said sidewalls are formed having a multiplicity of radial wires embedded in an elastomeric diaphragm.

3. The wheel assembly according to claim 1 wherein the wheel assembly is a driven wheel.

4. The wheel assembly according to claim 1 wherein said resilient rim member is a metallic band embedded in an elastomeric tire member.

5. The wheel assembly according to claim 1 wherein said axle means comprise a main axle and a space secondary stub axle.

6. The wheel assembly according to claim 5 wherein said disk members comprise a first inboard disk mounted on said main axle and a second outboard disk mounted on said secondary stub axle.

7. A pneumatic wheel assembly for vehicles comprising:
a resilient rim member;
supporting axle means comprising a main axle and a spaced secondary stub axle;
a pair of spaced cooperating disk members rotatably mounted on said axle means and comprising
an inboard disk mounted on said main axle, and
an outboard disk mounted on said stub axle;
flexible wheel sidewalls joining each disk member with said rim member;
means for canting said disk members whereby said rim member can be varied from a substantially round to a substantially elliptical configuration; and
universal means interconnecting said disks such that canting of one of said disks automatically cants the remaining disk.

8. The wheel structure according to claim 7 wherein, said disk-canting means is operative to pivot said first disk, and said second disk is mounted on said stub axle for combined axial and pivotal movement in response to the pivotal movement of said first disk.

9. The wheel structure according to claim 8 wherein,
said main axle has a spherical bushing thereon,
bearing means for combined pivotally and rotatably supporting said inboard disk on said main axle bushing are provided, and
said disk-canting means is connected to said bearing means for effecting canting movement of said inboard and outboard disks.

10. The wheel assembly according to claim 9 wherein, said main axle comprises an inner drive axle and a concentric outer tubular axle.

* * * * *